(12) United States Patent
Dürr

(10) Patent No.: US 11,984,038 B2
(45) Date of Patent: May 14, 2024

(54) CONCEPT FOR DESIGNING AND USING AN UAV CONTROLLER MODEL FOR CONTROLLING AN UAV

(71) Applicant: Sony Corporation, Tokyo (JP)

(72) Inventor: Peter Dürr, Stuttgart (DE)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 16/824,720

(22) Filed: Mar. 20, 2020

(65) Prior Publication Data

US 2020/0312163 A1 Oct. 1, 2020

(30) Foreign Application Priority Data

Mar. 26, 2019 (EP) .................................... 19165288

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *F03D 7/00* (2013.01);
(Continued)

(58) Field of Classification Search
CPC ...... G08G 5/0069; G08G 5/0073; G06T 7/70; G06T 7/75; G06T 7/20; B64C 39/024;
(Continued)

(56) References Cited

U.S. PATENT DOCUMENTS 5,649,064 A 7/1997 Jorgensen et al.
9,221,557 B1 * 12/2015 Friesel ...................... B64F 1/02
(Continued)

FOREIGN PATENT DOCUMENTS

CN 102073755 A 5/2011
CN 104950908 A 9/2015
(Continued)

OTHER PUBLICATIONS

Lillian, B., "Caltech Has Big UAV Plans for its New Autonomous Systems Research Center," Retrieved from the Internet URL: https://unmanned-aerial.com/caltech-big-uav-plans-new-autonomous-systems-research-center, Oct. 24, 2017, pp. 1-3.
(Continued)

*Primary Examiner* — Richard A Goldman
*Assistant Examiner* — Aaron K McCullers
(74) *Attorney, Agent, or Firm* — XSENSUS LLP

(57) ABSTRACT

Examples relate to a method for generating an Unmanned Aerial Vehicle (UAV) controller model for controlling an UAV, a system including an UAV, a wind generator, a motion-tracking system and a control module, and to an UAV. The method for training the UAV controller model includes providing a wind generator control signal to a wind generator, to cause the wind generator to emit a wind current towards the UAV. The method includes operating the UAV using the UAV controller model. A flight of the UAV is influenced by the wind generated by the wind generator. The method includes monitoring the flight of the UAV using a motion-tracking system to determine motion-tracking data. The method includes training the UAV controller model using a machine-learning algorithm based on the motion-tracking data.

15 Claims, 13 Drawing Sheets

(51) Int. Cl.

| | |
|---|---|
| *F03D 7/00* | (2006.01) |
| *F03D 7/02* | (2006.01) |
| *F03D 7/04* | (2006.01) |
| *G06N 20/20* | (2019.01) |
| *G06T 7/20* | (2017.01) |
| *G06T 7/70* | (2017.01) |
| *G06T 7/73* | (2017.01) |

(52) U.S. Cl.
CPC ............ *F03D 7/0276* (2013.01); *F03D 7/04* (2013.01); *G06N 20/20* (2019.01); *G06T 7/20* (2017.01); *G06T 7/70* (2017.01); *G06T 7/75* (2017.01); *G08G 5/0013* (2013.01); *B64U 2201/10* (2023.01); *F03D 7/045* (2013.01); *F03D 7/046* (2013.01)

(58) Field of Classification Search
CPC ... B64C 2201/141; F03D 7/00; F03D 7/0276; F03D 7/04; F03D 7/043; F03D 7/044; F03D 7/045; F03D 7/046; F03D 17/00
USPC ................................ 701/3, 59; 703/8; 700/31
See application file for complete search history.

(56) References Cited

U.S. PATENT DOCUMENTS

| | | | |
|---|---|---|---|
| 10,023,323 B1* | 7/2018 | Roberts | ................. B64C 39/024 |
| 2008/0004838 A1 | 1/2008 | Yungkurth et al. | |
| 2016/0355252 A1* | 12/2016 | Straub | ..................... B64G 1/36 |
| 2018/0285767 A1 | 10/2018 | Chew | |
| 2019/0041835 A1* | 2/2019 | Cella | ...................... G06N 3/006 |
| 2019/0178749 A1* | 6/2019 | Noca | ....................... G01M 9/04 |
| 2020/0249702 A1* | 8/2020 | Thurling | ................ B64C 39/024 |

FOREIGN PATENT DOCUMENTS

| | | |
|---|---|---|
| CN | 105873824 A | 8/2016 |
| CN | 107153425 A | 9/2017 |
| CN | 107238388 A | 10/2017 |
| CN | 107728642 A | 2/2018 |
| CN | 108305275 A | 7/2018 |
| CN | 108919640 A | 11/2018 |
| CN | 109407698 A | 3/2019 |
| CN | 109459446 A | 3/2019 |
| KR | 101229846 B1 | 2/2013 |

OTHER PUBLICATIONS

Matsuo, Y., "Special Contribution Numerical Wind Tunnel: History and Evolution of Supercomputing," Article in Fujitsu scientific & technical journal, vol. 53, No. 3, Apr. 2017, pp. 15-23.

Pinto, L., et al., "Robust Adversarial Reinforcement Learning," arXiv:1703.02702v1 [cs.LG], Mar. 8, 2017, 10 pages.

Silver, D., et al., "Mastering the Game of Go without Human Knowledge," 42 pages.

Sutton, R., and Barto, A., "Reinforcement Learning: An Introduction," Second edition, Complete draft, Mar. 16, 2018, pp. 1-528.

* cited by examiner

CONCEPT FOR DESIGNING AND USING AN UAV CONTROLLER MODEL FOR CONTROLLING AN UAV

CROSS-REFERENCE TO RELATED APPLICATION

The present application claims priority to European Patent Application 19165288.2 filed by the European Patent Office on Mar. 26, 2019, the entire contents of which being incorporated herein by reference.

FIELD

Examples relate to a method for generating an Unmanned Aerial Vehicle (UAV) controller model for controlling an UAV, a system comprising an UAV, a wind generator, a motion-tracking system and a control module, and to an UAV and a method for operating for an UAV.

BACKGROUND

When testing and characterizing aerial robots, stability against wind is a key performance criterion. In many cases it is not obvious, however, what kind of wind profiles are experienced by aerial robots in real situations, how to replicate such wind profiles, or how to best generate artificial wind profiles that are challenging for aerial robots.

Testing of aerial robots or drones currently involves indoor flight tests with artificial sources of wind such as wind tunnels or, more recently, wind generators like WindShape's WindShaper, that allow modulation of wind conditions at a high granularity both in space and time. In many cases it is understood that wind that varies spatially and temporally is more challenging for aerial robots than constant wind, but little is known about the characteristics of wind experienced by drones in real applications (e.g. that the wind profile looks like next to a moving wind turbine that should be inspected by a drone). It is also poorly understood what type of wind profile is most difficult for drones to mitigate.

So whereas wind generators may offer very granular control of the wind profile, the wind profiles used are often chosen more or less arbitrarily (e.g. a sine wave over space and time), which might not be as challenging as possible for the drone being tested. At the same time, drone developers may have an interest to create challenging wind profiles with low wind speeds, as generating higher wind speeds requires larger wind generators, more power, and crucially, larger testing areas.

SUMMARY

It is an objective of the present application to create wind profiles that offer an increased difficulty for unmanned aerial vehicles, and to provide unmanned aerial vehicles that are equipped to deal with the increased difficulty.

This objective is addressed by the independent claims of the present application.

Embodiments of the present disclosure are based on the idea that, in order to deal with difficult wind situations, an unmanned aerial vehicle (UAV) may be subjected to wind of a wind generator. The UAV may be operated using an UAV controller model, which may e.g. be a machine-learning model or a controller model that is generated using a machine-learning model. During the flight, the UAV may be tracked using a motion-tracking system, which generates motion-tracking data, and the UAV controller model may be trained based on the motion-tracking data. Optionally, the wind generator may be controlled based on a wind controller model, which may also be trained based on the motion-tracking data, and which may be trained such, that it increases a difficulty for the UAV.

The present disclosure thus provides a method to generate a flight control algorithm and/or wind profiles, the flight control algorithm being aimed at maintain stable flight in the presence of wind, e.g. by closing the loop between the performance of the aerial robot/UAV that is being tested and the wind generation through machine-learning, e.g. a reinforcement learning algorithm, thereby finding "adversarial" wind profiles designed to maximally challenge the particular robot being tested. In other words, the wind may be generated adversarially. Embodiments may further provide test devices for aerial robots and other robotic systems.

Compared to the manual design of both wind profiles and drone control systems, embodiments may provide a possibility of testing drones in very challenging wind conditions without very high wind speeds (that require larger testing areas, more power etc.). Embodiments may allow the testing of a drone with a wind profile tuned to be difficult for its precise characteristics. Embodiments may further allow the automatic synthesis/training of a controller (e.g. an UAV controller model) capable of withstanding very challenging wind conditions.

Embodiments of the present disclosure provide a method for designing (i.e. training) an UAV controller model for controlling an UAV. The method comprises providing a wind generator control signal to a wind generator, to cause the wind generator to emit a wind current towards the UAV. The method comprises operating the UAV using the UAV controller model. A flight of the UAV is influenced by the wind generated by the wind generator. The method comprises monitoring the flight of the UAV using a motion-tracking system to determine motion-tracking data. The method comprises synthesizing the UAV controller model using a machine-learning algorithm based on the motion-tracking data.

Embodiments of the present disclosure provide a system comprising an UAV that is operated using an UAV controller model. The system comprises a wind generator for generating a wind current. The system comprises a motion-tracking system for monitoring a flight of the UAV. The system comprises a control module configured to provide a wind generator control signal to the wind generator, to cause the wind generator to emit the wind current to influence the flight of the UAV. The control module is configured to monitor the flight of the UAV using the motion-tracking system to determine motion tracking data (i.e. of the trajectory of the UAV). The control module is configured to synthesize the UAV controller model using a machine-learning algorithm based on the motion-tracking data (of the trajectory of the UAV).

Embodiments of the present disclosure provide an UAV comprising one or more actuators for propelling the UAV. The UAV comprises one or more sensors for providing sensor data related to a motion of the UAV caused by wind. The UAV comprises a controller configured to control the one or more actuators based on an UAV controller model and based on the sensor data. The UAV controller model is at least partially based on motion-tracking data of a training UAV. The motion-tracking data is taken of the training UAV while a flight of the training UAV is affected by a wind current emitted by a wind generator.

Embodiments of the present disclosure provide a method for operating an UAV. The UAV comprises one or more actuators for propelling the UAV. The UAV comprises one or more sensors for providing sensor data related to a motion of the UAV caused by wind. The method comprises controlling the one or more actuators based on an UAV controller model and based on the sensor data. The UAV controller model is at least partially based on motion-tracking data of a training UAV. The motion-tracking data is taken of the training UAV while a flight of the training UAV is affected by a wind current emitted by a wind generator.

Embodiments of the present disclosure provide computer program having a program code for performing at least one of the methods, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
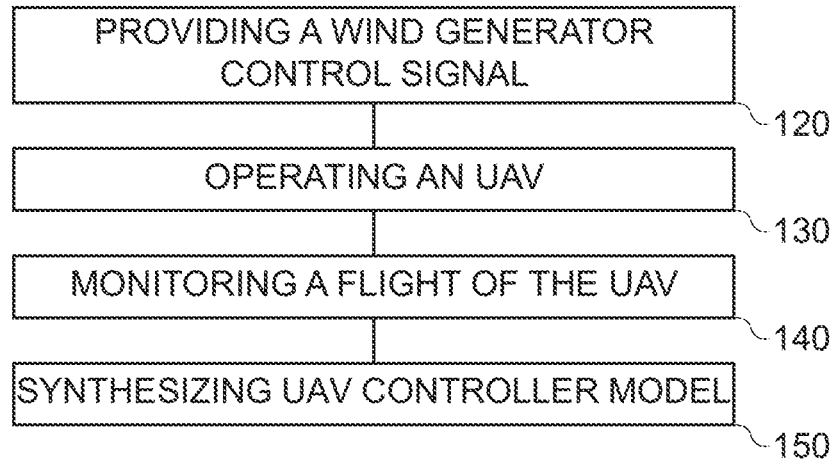
FIGS. 1a and 1b show flow charts of embodiments of a method for designing an UAV controller model.
Figure 1B:
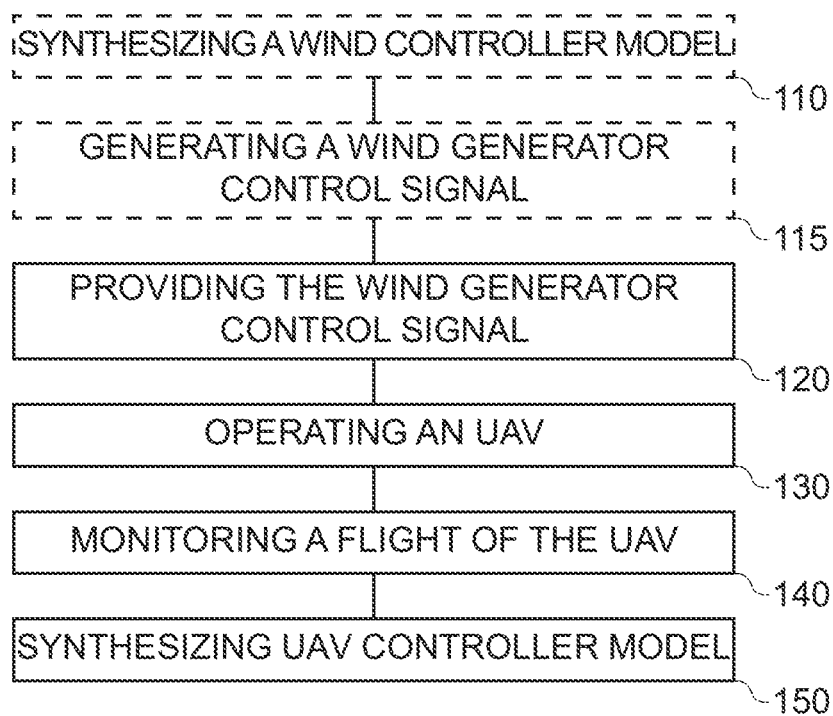

FIGS. 1a and 1b show flow charts of embodiments of a method (e.g. a computer-implemented method) for designing (i.e. training or generating) an UAV controller model that is suitable for controlling an UAV. The method comprises providing 120 a wind generator control signal to a wind generator, to cause the wind generator to emit a wind current towards the UAV. The method comprises operating 130 the UAV using the UAV controller model. A flight of the UAV is influenced by the wind generated by the wind generator. The method comprises monitoring 140 the flight of the UAV using a motion-tracking system to determine motion-tracking data. The method comprises synthesizing 150 (i.e. training, designing, generating and/or refining) the UAV controller model using a machine-learning algorithm based on the motion-tracking data.

Figure 1C:
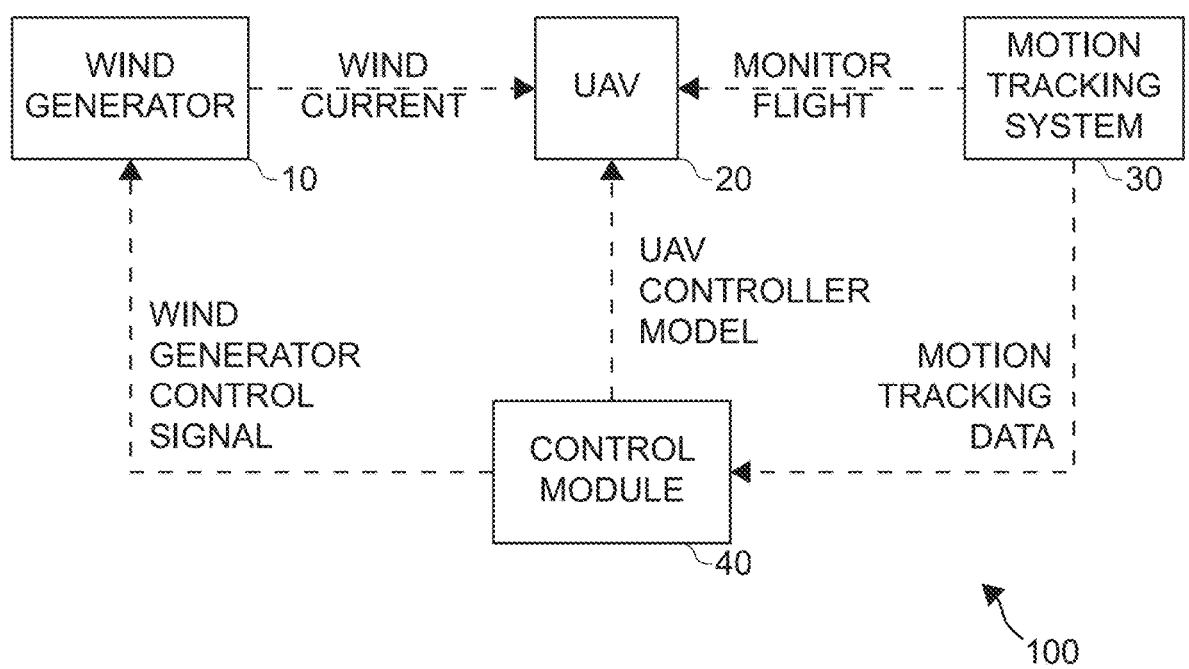
FIG. 1c shows a block diagram of an embodiment of a system.

FIG. 1c shows a block diagram of an embodiment of a system. The system may be suitable or configured to execute the method of FIGS. 1a and/or 1b. The system 100 comprises an UAV 20 that is operated using an UAV controller model. The system 100 comprises a wind generator 10 for generating a wind current. The system comprises a motion-tracking system 30 for monitoring a flight of the UAV 20. The system comprises a control module 40 that is coupled to the wind generator 10, the UAV 20 and the motion tracking system 30. The control module 40 may be configured to execute the method of FIGS. 1a and/or 1b. For example, the control module 40 is configured to provide a wind generator control signal to the wind generator, to cause the wind generator to emit the wind current to influence the flight of the UAV. The control module 40 is configured to monitor the flight of the UAV using the motion-tracking system to determine motion-tracking data. The control module 40 is configured to synthesize (i.e. train) the UAV controller model using a machine-learning algorithm based on the motion-tracking data.

The following description relates both to the method of FIGS. 1a and/or 1b and the system of FIG. 1c.

At least some embodiments relate to a method and system for designing an UAV controller model for controlling an UAV. In embodiments, the UAV controller model may be a set of instructions that is suitable for controlling a stability of an UAV, i.e. a set of instructions used by the UAV to counteract an influence of wind on the UAV. For example, the UAV controller model may be a machine-learning model, e.g. a deep neural network. Alternatively, the UAV controller model may comprise a plurality of controller parameters that are derived from a machine-learning model. As different UAVs behave differently in the wind (e.g. due to their means of propulsion or due to their design), the UAV controller model may be specific to a type and/or a configuration of the UAV. This may take into account the different geometries and/or different flight properties of different UAVs. For example, the Unmanned Aerial Vehicle 20, i.e. drone, may be one of a quadcopter, a mono-copter, a bi-copter, and a fixed-wing UAV, such as a plane or a vertical take-off and landing aircraft (VTOL). The UAV is operated using the UAV controller model. For example, the UAV may be configured to use the UAV controller model to counteract an influence of wind on the UAV, e.g. by controlling one or more actuators of the UAV such, that a desired position and/or angle of the UAV is (optimally) maintained when the UAV is under the influence of wind.

During the flight that is tracked using the motion tracking system, the flight of the UAV is influenced by the wind generated by the wind generator, e.g. by the wind current emitted by the wind generator 10 that is incident to the UAV. For example, the wind generated by the wind generated may be generated to disturb the flight of the UAV. The method comprises providing 120 a wind generator control signal to the wind generator 10, to cause the wind generator to emit the wind current towards the UAV 20. For example, the wind generator control signal may be time-variant, i.e. the wind generator control signal may cause the wind generator to emit different wind currents over time. Additionally or alternatively, the wind generator control signal may be spatially variant, i.e. the wind generator control signal may cause the wind generator to vary a spatial composition of the wind current. In other words, the wind generator control signal may be suitable for independently controlling a plurality of wind generator units of the wind generator. The plurality of wind generator units of the wind generator may provide spatial diversity, i.e. the wind current of the wind generator may be spatially varied based on the wind generator control signal. The plurality of wind generator units may be suitable for emitting a plurality of streams of wind. The plurality of streams of wind may be based on the wind generator control signal that is suitable for independently controlling a plurality of wind generator units of the wind generator. The wind current may be based on (i.e. composed of or comprise) the plurality of streams of wind. This may provide a complex stream of wind that may be more difficult for the UAV to handle. In other words, the spatial composition of the wind current may be based on the wind generator control signal that is suitable for independently controlling a plurality of wind generator units of the wind generator. In at least some embodiments, the plurality of wind generator units are arranged in an array configuration. An array configuration may be a configuration, in which the plurality of wind generator units are arranged in a regular matrix pattern. For example, the array configuration may be a two-dimensional array configuration, i.e. may comprise at least 2×2 wind generator units. Alternatively, the array configuration may be a one-dimensional array configuration, i.e. may comprise at least 1×2 wind generator units. Preferably, larger array configurations may be used, i.e. at least 4×4 wind generator units (or at least 5×5 wind generator units, at least 8×8 wind generator units, at least 12×12 wind generator units, at least 16×16 wind generator units). In some examples, the array may be a two-dimensional array having the same number of wind generators in both dimensions, such as 32×32 wind generator units. Alternatively, the array may be a two-dimensional array having a first number of wind generators in a first dimension, and a second number of wind generators in a second dimension of the array, such as 64×16 wind generator units.

The method comprises monitoring 140 the flight of the UAV using a motion-tracking system to determine motion-tracking data. For example, at least one of a position, a deflection from a desired position, a (desired) orientation, and a deflection of a desired orientation of the UAV may be monitored by the motion-tracking system. In other words, the motion tracking data may comprise at least one of a position, a deflection from a desired position, an angle, and a deflection of a desired angle of the UAV.

For example, the motion-tracking system may be a camera-based motion-tracking system, such as an image-based motion-tracking system or a (light-based) Time of Flight-based motion tracking system. For example, the motion-tracking system may comprise one or more cameras, e.g. one or more visual cameras and/or one or more time of flight-cameras. Alternatively or additionally, the motion-tracking system may be a radio-based positioning system, e.g. an Ultra-Wideband (UWB) radio-based positioning system. In a radio-based positioning system, the position of a tracked entity, such as the UAV, is monitored by measuring a time of flight of radio signals. For example, the motion-tracking system may comprise a plurality of radio transceivers, and the UAV may be equipped with a radio tag (e.g. a UWB tag). To determine the position of the UAV, the plurality of radio transceivers may emit a first radio pulse, such as an UWB radio pulse, and the radio tag may reply to the first coded radio pulse with a second radio pulse (i.e. a burst). The radio tag may comprise a spark-gap-style exciter that generates a short, coded, nearly instantaneous burst based on the received first radio pulse. The second radio pulse may be received by the plurality of radio transceivers, and the position of the UAV may be triangulated based on a time of flight of the received second radio pulse at the plurality of radio transceivers. If an Ultra-Wideband (UWB) radio-based positioning system is used, both the first radio pulse and the second radio pulse may be transmitted over a spectrum that is wider than 200 MHz (or wider than 500 MHz, wider than 1 GHz). In at least some embodiments, the motion-tracking system is external to the UAV. For example, in a camera-based motion-tracking system, the camera or cameras of the motion-tracking system may be external to the UAV, i.e. arranged at fixed positions in a monitoring area. In a radio-based positioning system, the plurality of radio transceivers may be external to the UAV, i.e. arranged at fixed positions in a monitoring area.

The method comprises synthesizing (i.e. training) 150 the UAV controller model using a machine-learning algorithm based on the motion-tracking data. In the present application, the terms "synthesizing" and "training" may be used interchangeably. The synthesis of the UAV controller model may be further based on an estimation of wind conditions based on sensor data of one or more sensors of the UAV. This may further improve the training of the UAV controller model.

Machine learning refers to algorithms and statistical models that computer systems may use to perform a specific task without using explicit instructions, instead relying on models and inference. For example, in machine learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be synthesized or trained using training images as input and training content information as output. By synthesizing the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By synthesizing a machine-learning model using training sensor data and a desired output, e.g. motion tracking data and a desired controller output, the machine-learning model "learns" a transformation between the sensor data and the output, which can be used to provide an output based on non-training sensor data provided to the machine-learning model. Such learning principles are also denoted "supervised" learning. In embodiments of the present disclosure, a reinforcement learning-based approach may be used, i.e., the desired controller output is unknown. For that reason, we methods like Actor-Critic (with DPG), or population based search may be that can approximate the optimal controller output through interactions with the environment and learn from the reinforcement signal.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

In embodiments, the UAV controller model may be the machine-learning model or may be based on the machine-learning model. The machine-learning model may be adapted to provide control instructions (e.g. for one or more actuators of the UAV) based on the estimation of the wind conditions (that are based on sensor data of one or more sensors of the UAV). To synthesize/train the machine-learning model, the motion tracking data may be used as a quality indicator. For example, the method may comprise comparing the motion tracking data to a desired flight path of the UAV. The lower the difference between the motion tracking data and the desired flight path is, the higher the quality of the controlling performed by or based on the UAV controller model may be. In other words, the sensor data or the estimation of the wind conditions may be the input of the machine-learning model, and the motion tracking data may be used as a quality indicator (i.e. for defining a reward function) in the training of the machine-learning model.

For example, the machine-learning model may be an artificial neural network (ANN), such as a deep neural network. ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine. Support vector machines (i.e. support vector networks) are supervised learning models with associated learning algorithms that may be used to analyze data, e.g. in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be trained using a genetic algorithm, which is a search algorithm and heuristic technique that mimics the process of natural selection.

In at least some embodiments, the UAV controller model may be synthesized/trained 150 with the aim of decreasing a difference between a desired flight path of the UAV and a flight path of the UAV as monitored by the motion-tracking system. To achieve this, a reinforcement-learning based machine-learning algorithm or a population-based machine-learning algorithm may be used.

For example, reinforcement learning may be used to synthesize (train) the machine-learning model. In reinforcement learning, one or more software actors (called "software agents") are trained to take actions in an environment. Based on the taken actions, a reward is calculated. In embodiments, a reward function used for training the UAV controller model may be based on the difference between the desired flight path of the UAV and the flight path of the UAV as monitored by the motion-tracking system. Reinforcement learning is based on training the one or more software agents to choose the actions such, that the cumulative reward is increased, leading to software agents that become better at the task they are given (as evidenced by the increasing rewards). For example, the UAV controller model may be synthesized 150 based on a reinforcement learning-based machine-learning algorithm. For example, a Deterministic Policy Grading algorithm and/or a state estimator may be used in the reinforcement learning-based machine-learning algorithm. The reinforcement learning-based machine-learning algorithm may be used to iteratively improve the performance of the UAV controller model. For example, the UAV controller model may be synthesized 150 using an Actor-Critic-approach. An Actor-Critic approach may be used to improve the UAV controller model using a value-based metric of the performance of the UAV controller model. In an Actor-Critic approach, two neural networks may be used, a critic that measures how good the actor performs (e.g. based on the difference between the desired flight path of the UAV and the flight path of the UAV as monitored by the motion-tracking system, value-based), and an actor that controls the agent (policy-based), e.g. the UAV. In this case, the UAV controller model may be the actor, and an additional neural network may be used as a critic. The actor (i.e. the UAV controller model) may be iteratively improved (e.g. by choosing variations that improve the performance of the actor as measured by the critic).

Alternatively, the UAV controller model may be synthesized (i.e. trained) 150 based on a population-based machine-learning algorithm, such as an evolutionary algorithm. Population-based machine-learning algorithms also provide a way of providing an improved UAV controller model, by selecting an improved model from a plurality of trained models. For example, the UAV controller model may be synthesized using a population of machine-learning models. In a first implementation, the parameters of the machine-learning models may be used as the dimensions of the search space. The population-based machine-learning algorithm may vary the parameters of the machine-learning models of the population, e.g. using an evolutionary algorithm, and may evaluate the performance of the machine-learning models of the population. For example, an approach similar to the approach of Soltoggio et al. from 2007: "Evolving Neuromodulatory Topologies for Reinforcement Learning-like Problems" may be used. Alternatively, within the population of machine-learning models, the hyperparameters (i.e. elements that are orthogonal to the model itself) and weight initializations of the machine-learning models may be varied. In this case, the population-based machine-learning algorithm may vary the hyperparameters and/or the weight initializations of the machine-learning models of the population, and may evaluate the performance of the machine-learning models of the population. If a machine-learning model of the population underperforms relative to other machine-learning models of the population, it may be replaced with a variation of a better-performing machine-learning model of the population. The evaluation of the performance of the machine-learning models of the population may be based on the difference between the desired flight path of the UAV and the flight path of the UAV that is operated using the respective machine-learning model as monitored by the motion-tracking system. One of the machine-learning models that performs above average (e.g. the best) may be selected as UAV controller model.

In at least some embodiments, not only the UAV, but also the wind generator may be controlled using a machine-learning model. In other words, the method may comprise generating 115 the wind generator control signal based on a wind controller model. The wind emitted towards the UAV may be based on the wind controller model. For example, the wind controller model may be machine-learning model as introduced above, such as an ANN or deep neural network. The method may comprise synthesizing (i.e. training) 110 the wind controller model using a machine-learning algorithm based on the motion-tracking data. The wind controller model may be synthesized/trained in conjunction with the UAV controller model. This may provide an improved wind controller model, which may provide a wind profile having an increased difficulty.

In contrast to the UAV controller model, the wind controller model may be synthesized 110 with the aim of increasing a difference between a desired flight path of the UAV and a flight path of the UAV as monitored by the motion-tracking system. The difference may be used as an objective metric in the training of the UAV controller model.

Similar to the UAV controller model, the wind controller model may be synthesized 110 based on a reinforcement learning-based machine-learning algorithm. The reinforcement learning-based machine-learning algorithm may be used to iteratively improve the performance of the wind controller model. For example, a Deterministic Policy Grading (DPG) algorithm may be used in the reinforcement learning-based machine-learning algorithm. A reward function used for training the wind controller model may be based on the difference between the desired flight path of the UAV and the flight path of the UAV as monitored by the motion-tracking system. For example, the wind controller model may be synthesized 110 using an Actor-Critic-approach. In this case, the critic may measure how good the wind controller model performs, e.g. based on the difference between the desired flight path of the UAV, and the actor may be the wind controller model. In other words, the wind controller model may be the actor, and an additional neural network may be used as a critic. The actor (i.e. the wind controller model) may be iteratively improved (e.g. by choosing variations that improve the performance of the actor as measured by the critic).

Alternatively, the wind controller model may be synthesized 110 based on a population-based machine-learning algorithm. For example, the wind controller model may be synthesized/trained using a population of machine-learning models, similar to the UAV controller model. The evaluation of the performance of the machine-learning models of the population may be based on the difference between the desired flight path of the UAV and the flight path of the UAV that is operated using the respective machine-learning model as monitored by the motion-tracking system. One of the machine-learning models that performs best (as evaluated) may be selected as wind controller model. The evaluation of the performance of the machine-learning models of the population may be based on the difference between the desired flight path of the UAV and the flight path of the UAV that is influenced by wind that is emitted based on the wind generator control signal generated using the respective machine-learning model, as monitored by the motion-tracking system. One of the machine-learning models that performs above average (e.g. the best) may be selected as wind controller model.

Figure 8:
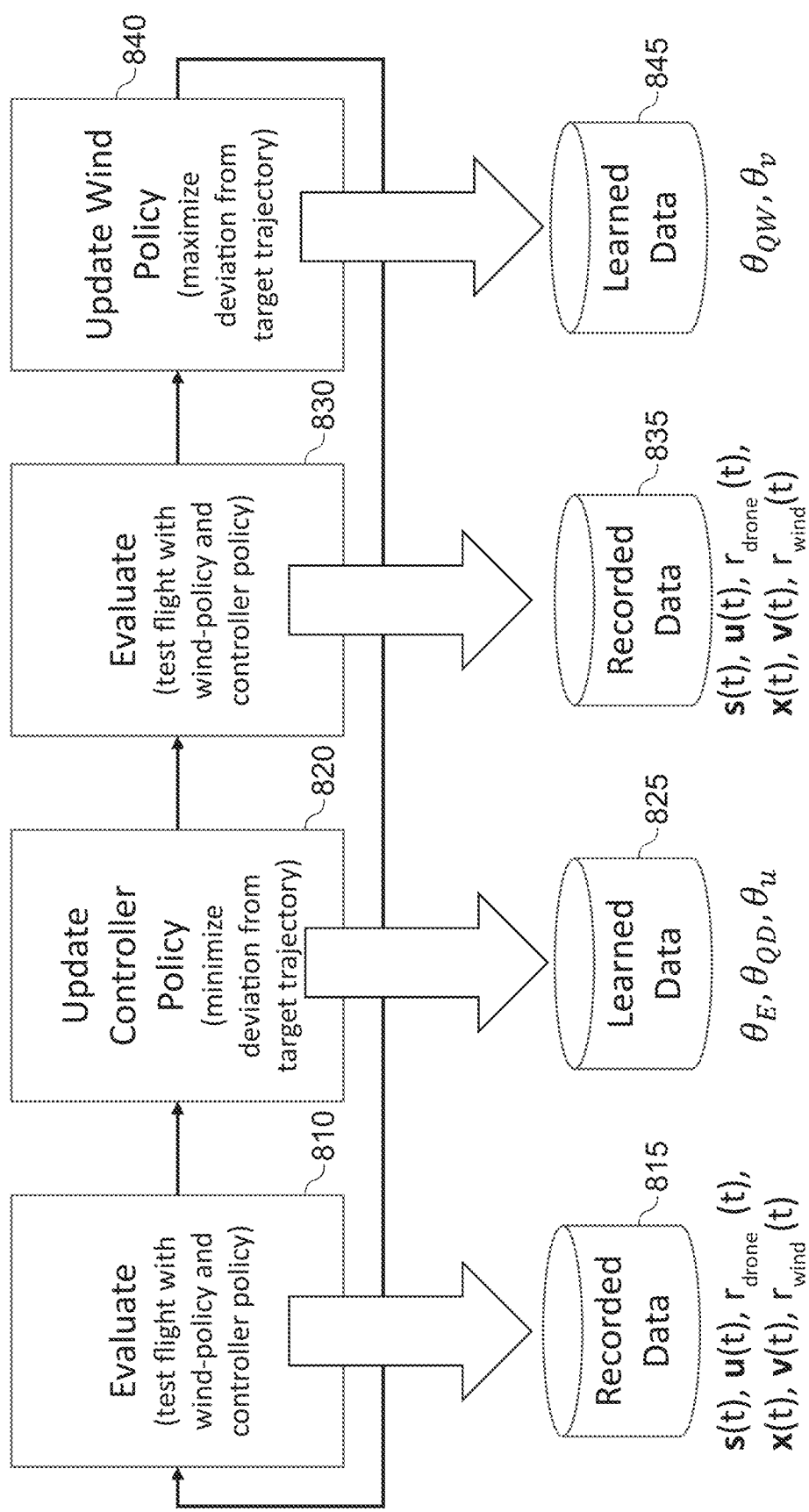
FIG. 8 shows a schematic diagram of an exemplary embodiment of an iterative adversarial learning process.
Figure 9:
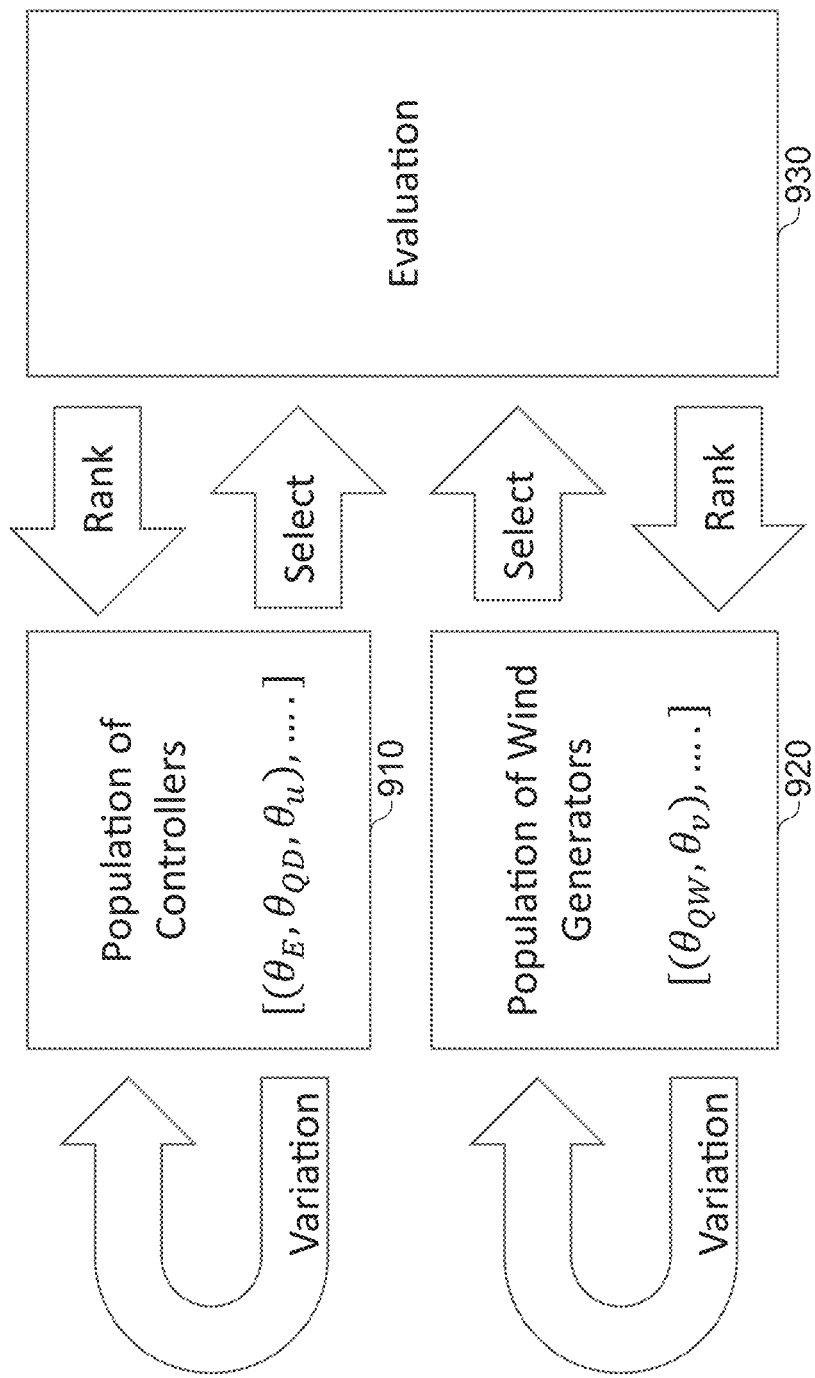
FIG. 9 shows a schematic diagram of an exemplary embodiment of a population-based Stochastic Search.

In at least some embodiments, the UAV controller model and the wind controller model are trained against each other using an adversarial reinforcement learning-based machine-learning algorithm or using an adversarial population-based machine-learning algorithm (e.g. as shown in FIGS. 8 and 9). This may enable an iterative improvement of both the wind controller model and the UAV controller model. For example, the UAV controller model and the wind controller model may be trained against each other alternatingly, i.e. after evaluating a plurality of UAV controller models against a single wind controller model and consequently improving one or more of the UAV controller models, a plurality of wind controller models may be evaluated against a single (improved) UAV controller model, one or more of the wind controller models may be improved, followed by an evaluation of a plurality of (improved) UAV controller models against a single (improved) wind controller model. Alternatively, the UAV controller model and the wind controller model may be trained against each other simultaneously, i.e. after each training round, the best wind controller model may be evaluated against the best UAV controller model, and the results of the evaluation may be used to train both the UAV controller model and the wind controller model. The training may be terminated after reaching a maximally desired training time or after reaching a threshold for the difference between the desired flight path of the UAV and the flight path of the UAV as monitored by the motion-tracking system, e.g. an upper threshold if the aim is the generation of an improved wind controller model, and a lower threshold, if the aim is the generation of an improved UAV controller model.

In embodiments the control module 40 may be implemented using one or more processing units, one or more processing devices, any means for processing, such as a processor, a computer or a programmable hardware component being operable with accordingly adapted software. In other words, the described function of the control module 40 may as well be implemented in software, which is then executed on one or more programmable hardware components. Such hardware components may comprise a general-purpose processor, a Digital Signal Processor (DSP), a micro-controller, etc.

The control module 40 may be coupled to the motion-tracking system 30 and/or with the wind generator 10 using at least one interface. The at least one interface 12 may correspond to one or more inputs and/or outputs for receiving and/or transmitting information, which may be in digital (bit) values according to a specified code, within a module, between modules or between modules of different entities. For example, the at least one interface 12 may comprise interface circuitry configured to receive and/or transmit information.

More details and aspects of the system and/or of the method are mentioned in connection with the proposed concept or one or more examples described above or below (e.g. FIG. 2a to 9). The system and/or the method may comprise one or more additional optional features corresponding to one or more aspects of the proposed concept or one or more examples described above or below.

Figure 2A:
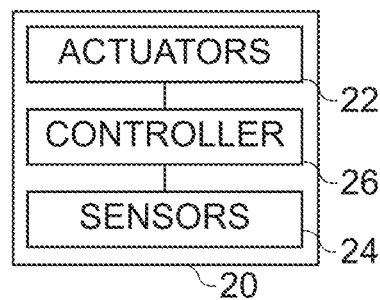
FIG. 2a shows a block diagram of an embodiment of an UAV.

FIG. 2a shows a block diagram of an embodiment of an Unmanned Aerial Vehicle 20, e.g. the UAV 20 introduced in connection with FIGS. 1a to 1c. The UAV 20 comprises one or more actuators 22 for propelling the UAV. The UAV 20 comprises one or more sensors 24 for providing sensor data related to a motion of the UAV caused by wind. The UAV 20 comprises a controller 26 configured to control the one or more actuators based on an UAV controller model and based on the sensor data. The UAV controller model is at least partially based on motion-tracking data of a training UAV. The motion-tracking data is taken of the training UAV while a flight of the training UAV is affected by a wind current emitted by a wind generator. The controller 26 is coupled to the one or more actuators 22 and to the one or more sensors 24.

Figure 2B:
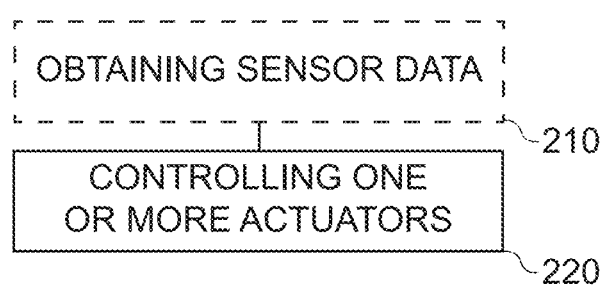
FIG. 2b shows a flow chart of an embodiment of a method for operating an UAV.

FIG. 2b shows a flow chart of an embodiment of a (corresponding) method for operating an UAV. The UAV comprises one or more actuators for propelling the UAV. The UAV comprises one or more sensors for providing sensor data related to a motion of the UAV caused by wind. The method may comprise obtaining 210 the sensor data from the one or more sensors and/or from the one or more actuators. The method comprises controlling 220 the one or more actuators based on an UAV controller model and based on the sensor data. The UAV controller model is at least partially based on motion-tracking data of a training UAV. The motion-tracking data is taken of the training UAV while a flight of the training UAV is affected by a wind current emitted by a wind generator.

The following description relates to both the UAV 20 of FIG. 2a, and the method of FIG. 2b.

The UAV comprises the one or more actuators for propelling the UAV. For example, the one or more actuators may correspond to one or more motors that are used to drive one or more propellers of the UAV. For example, if the UAV is a quadcopter, the UAV may comprise four motors to drive four propellers of the UAV, if the UAV is a bi-copter, two motors may be used. For example, the one or more actuators may be controlled based on an actuator control signal. The actuator control signal may be suitable for individually controlling a rotation rate of the one or more actuators. By using the one or more actuators of the UAV with different rotation rates (e.g. if the UAV is a quadcopter), a pitch, roll and/or yaw of the UAV may be controlled.

The UAV comprises the one or more sensors for providing sensor data related to a motion of the UAV caused by wind. For example, the one or more sensors may comprise one or more sensors of the group of an inertial sensor, a magnetometer, a barometric sensor, a satellite positioning sensor, an image sensor, a force sensor, a torque sensor, a range sensor (such as a laser rangefinder or ultrasonic sensor), a depth sensor (such as a time of flight camera, structured light camera, stereo camera, etc.), a radio signal transceiver (e.g. from a UWB positioning system), and an anemometer. For example, the force sensor and/or the torques sensor may be part of the one or more actuators. The controller may be configured to obtain the sensor data from the one or more sensors and/or from the one or more actuators. This may enable a use of actuator information alongside the sensor information.

Consequently, the sensor data may comprise one or more elements of the group of inertial sensor data (e.g. an acceleration and/or an angular velocity of the UAV, magnetometer data (e.g. a magnetic field vector of the magnetometer), barometric data (i.e. air pressure), satellite positioning data (e.g. of a Global Navigation Satellite System such as the Global Positioning System, BeiDou Navigation Satellite System, GLONASS etc.), image data (e.g. of one or multiple cameras, ToF cameras, multi/hyper-spectral cameras, IR cameras etc.), actuator data (e.g. voltage, current, Rotations Per Minute (RPM), torque, and/or force of the one or more actuators), anemometer data (wind speed), force sensor data, torque sensor data, range sensor data, depth sensor data and radio positioning sensor data. Furthermore, the sensor data may comprise sensor data of external sources, such as weather reports, data from ground-based sensors (e.g., anemometers next to the ground-station etc.).

The controller is configured to control the one or more actuators based on the UAV controller model and based on the sensor data. For example, the controller may be configured to provide the actuator control signal to the one or more actuators based on the UAV controller model and based on the sensor data. If the UAV is instructed to stay in position, or if the UAV is instructed to follow a trajectory, the controller may be configured to use the UAV controller model to counteract the effects of wind on the UAV, e.g. to try to keep the UAV from leaving the position or the trajectory due to the wind. To achieve this, the controller may be configured to estimate wind conditions based on the sensor data, and to use the UAV controller model to counteract the effects of the wind based on the estimated wind conditions. Commonly, the estimation of the wind conditions may be performed by the UAV controller model. In other words, the sensor data may be provided as input to the UAV controller model, and the UAV controller model may output the actuator control signal, which may then be provided to the one or more actuators. If the UAV is instructed to follow a trajectory (e.g. to move into a specific direction or orientation), the trajectory may also be provided as input to the UAV controller model.

The UAV controller model is at least partially based on motion-tracking data of a training UAV that is taken of the training UAV while a flight of the training UAV is affected by a wind current emitted by a wind generator. Additionally, the wind current emitted by a wind generator may also be based on a machine-learning model, i.e. a wind controller model. For example, the UAV controller model may be designed and/or synthesized using a machine-learning algorithm based on the motion-tracking data of the training UAV, e.g. as introduced in connection with FIGS. 1a to 1c. The UAV controller model may be synthesized with the aim of decreasing a difference between a desired flight path of the training UAV and a flight path of the training UAV as monitored by the motion-tracking system. To achieve this, a reinforcement-learning based machine-learning algorithm or a population-based machine-learning algorithm may be used. For example, the motion-tracking data may be used as basis of a reward function of a reinforcement-learning machine-learning algorithm. In at least some embodiments, the UAV controller model may be synthesized using the method and/or system introduced in connection with FIGS. 1a to 1c.

In embodiments the controller 26 may be implemented using one or more processing units, one or more processing devices, any means for processing, such as a processor, a computer or a programmable hardware component being operable with accordingly adapted software.

In other words, the described function of the controller 26 may as well be implemented in software, which is then executed on one or more programmable hardware components. Such hardware components may comprise a general-purpose processor, a Digital Signal Processor (DSP), a micro-controller, etc.

More details and aspects of the UAV and/or of the method are mentioned in connection with the proposed concept or one or more examples described above or below (e.g. FIG. 1a to 1c, 3 to 9). The UAV and/or the method may comprise one or more additional optional features corresponding to one or more aspects of the proposed concept or one or more examples described above or below.

Recent progress in reinforcement learning (RL), have led to stunning advances in game playing (see e.g. Silver et al. 2016) and real-time control (see e.g. Pinto et al. 2017). At least some embodiments of the present application may apply this flavor of adversarial RL to the objective of simultaneously designing a challenging wind profile (e.g. by training the wind controller model), and a control system (e.g. the UAV controller model) able to sustain controlled flight in the presence of wind.

Figure 3:
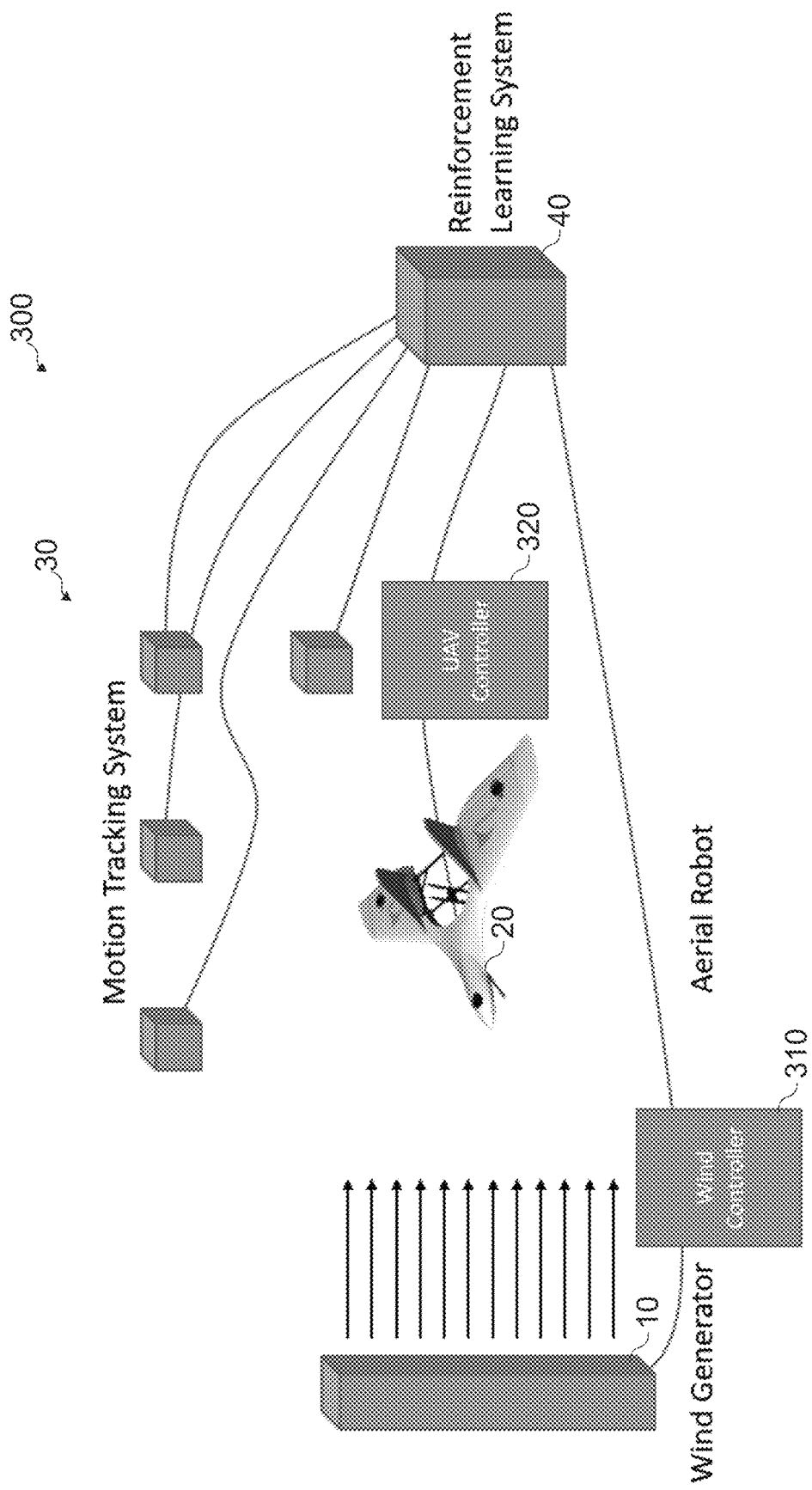
FIG. 3 shows a block diagram of a further embodiment of a system.

To this end, a setup involving an aerial robot (e.g. the UAV 20), a wind generator (e.g. WindShape's WindShaper, the wind generator 20) and a motion-tracking system (e.g. the motion-tracking system 30) may be considered, all connected to a main computer (e.g. the control module 40) which controls these components (see FIG. 3). Adversarial reinforcement learning may then be applied using two agents—called controller and adversary—, which may be jointly trained.

The controller may try to implement a control law (e.g. encoded in a deep neural network), such as the UAV controller model, that may stabilize the aerial robot in the presence of wind. The performance of the agent—and thus the reinforcement signal may be obtained through the motion-tracking system which may measure the position and orientation of the drone during the flight (performance can then be computed from this measurement, e.g. as integral of the deviation from asset position and orientation over a fixed duration). Simultaneously, the adversary may be trained (e.g. by training the wind controller model) to control the wind generator in a way that disrupts the controller (again, the control law may be encoded in a neural network), and it may get its reward from the failure of the controller.

The training of the adversarial agents may be enhanced by using simulation models. An advanced embodiment of the present disclosure may also simultaneously improve or optimize the simulation to resemble the results from real experiments.

Another embodiment of the present disclosure further uses a machine learning-based analysis of the drone's flight data during wind exposure to detect anomalies, e.g. due to hardware failures, ageing, or other influences.

FIG. 3 shows a block diagram of a further embodiment of a system 300. The system 300 comprises a wind generator 10 for generating a wind current. The wind generator 10 is controlled by a wind controller 310 (e.g. using the wind controller model), which is trained by a reinforcement learning system 40 (e.g. the control module 40). The system 300 further comprises an aerial robot 20 (e.g. the UAV 20), which is controlled by an UAV controller 320 (e.g. using the UAV controller model), which is trained by the reinforcement learning system 40. The system 300 further comprises a motion-tracking system 30 comprising a plurality of motion-tracking modules. The motion-tracking system 30, the wind controller 310 and the UAV controller 320 are coupled to the reinforcement learning system 40.

Figure 4A:
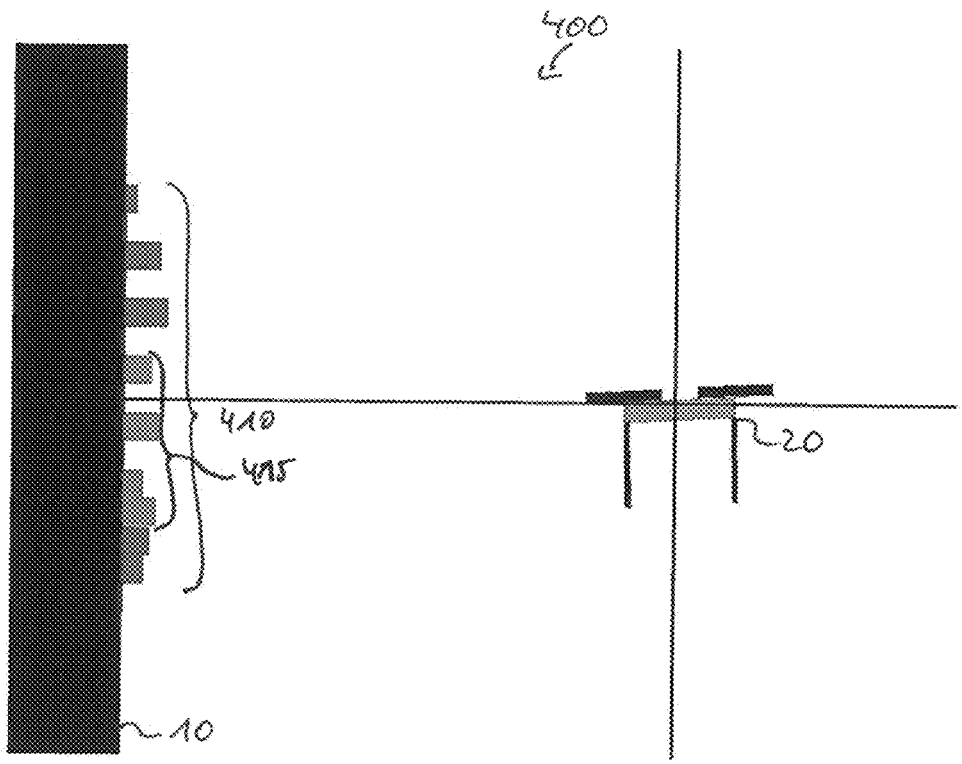
FIGS. 4a to 4e shows exemplary data of a deflection of two types of UAV in wind generated by a wind generator.

FIGS. 4a to 4e shows exemplary data of a deflection of two types of UAV in wind generated by a wind generator. In FIG. 4a, the general setup of a system 400 comprising a wind generator 10 and an UAV 20 is shown. The wind generator comprises a plurality of wind generator units suitable for emitting a plurality of streams of wind 410. In other words, the wind generator 10 comprises N wind generators ("pixels"), controlled by an agent trying to deflect the drone as much as possible. The size of the bars 410 represent the propeller speed. Only wind of the bars denoted by reference sign 415 hits the drone. The drone/UAV 20 comprises a controller and tries to stay at a set position.

Figure 4B:
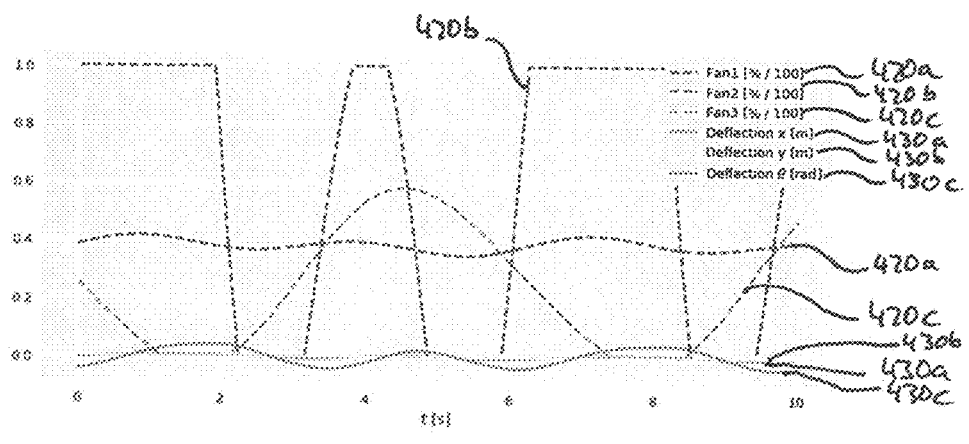
Figure 4C:
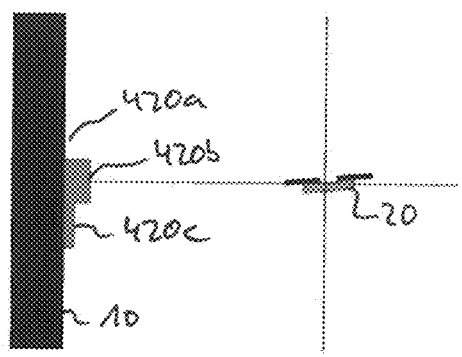
Figure 4D:
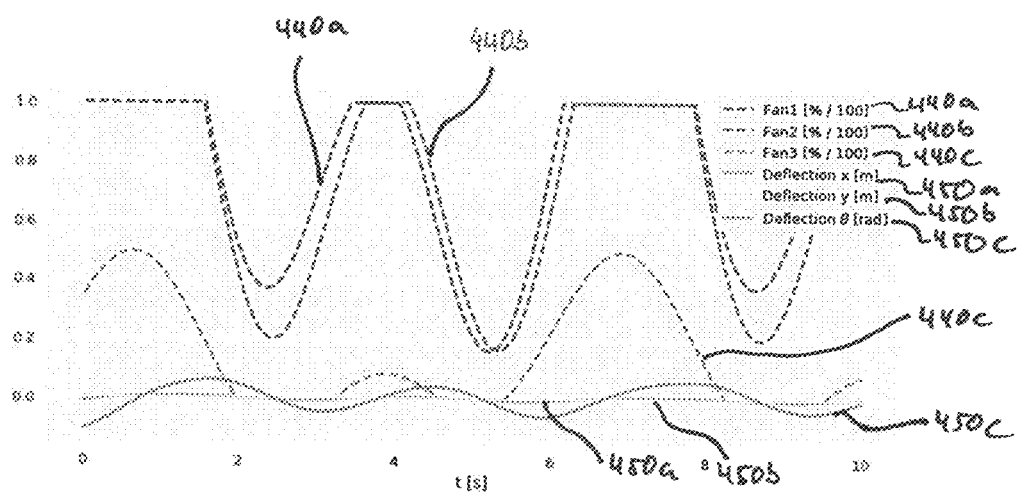
Figure 4E:
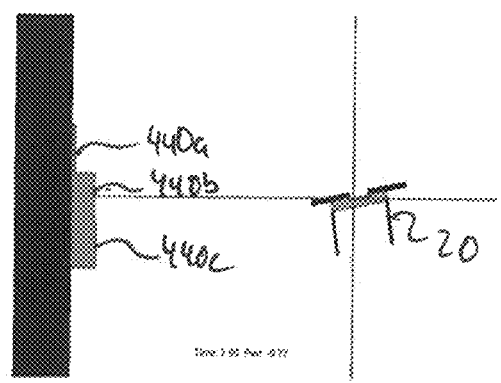

FIGS. 4b to 4e show data of an implemented proof of concept including a 2D physics model, including rough simulation of wind dynamics and a simplified drone control. In FIG. 4b to 4e, a wind profile improvement/optimization has been carried out (in simulation) with two different types of drone (without legs, shown in FIGS. 4b and 4c, and with legs, shown in FIGS. 4d and 4e) and a simple, "3 pixel" wind generator 10 (i.e. N=3). FIGS. 4c and 4e illustrate the setup, while FIGS. 4b and 4d show the resulting wind profiles. In FIGS. 4b and 4c, reference signs 420a to 420c denote the output of three wind generator units of the wind generator 10, and reference signs 430a to 430c denote the deflection of the drone 20 (without legs), with 430a denoting the deflection in the x-axis (in meters), 430b denoting the deflection in the y-axis (in meters), and 430c denoting the angular deflection Θ (in radians). In FIGS. 4d and 4e, reference signs 440a to 440c denote the output of three wind generator units of the wind generator 10, and reference signs 450a to 450c denote the deflection of the drone 20 (with legs), with 450a denoting the deflection in the x-axis (in meters), 450b denoting the deflection in the y-axis (in meters), and 450c denoting the angular deflection Θ (in radians). As expected, results show a clear difference between the improved/optimized wind profiles of wind generated to disturb the drones of FIG. 4c and FIG. 4e. As can be seen, the resulting deflection in x-axis and y-axis is minimal in both cases, while the resulting angular deflection is slightly elevated in the case of FIGS. 4d/4e.

Figure 5A:
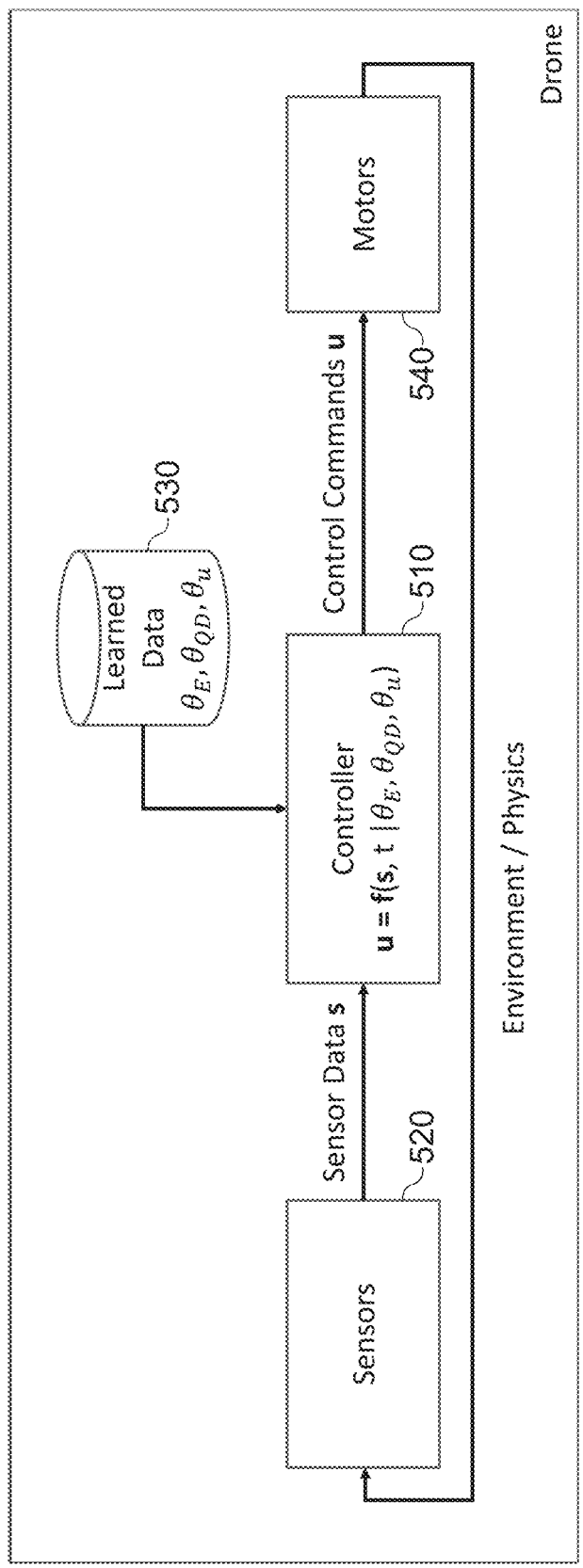
FIGS. 5a and 5b show flow charts of embodiments of an UAV controller model.
Figure 5B:
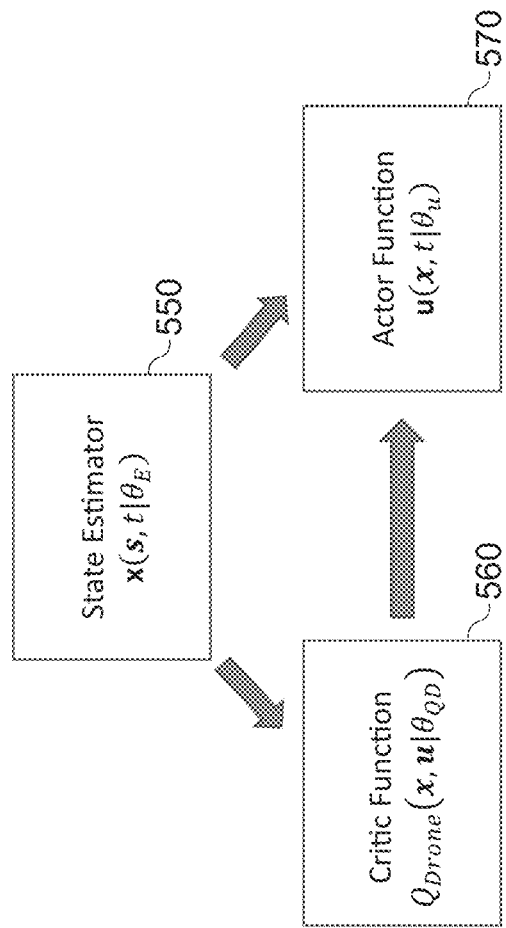

FIGS. 5a and 5b show flow charts of embodiments of an UAV controller model. FIG. 5a shows the application of the UAV controller model, e.g. when used for operating an UAV. In FIG. 5a, a controller 510 (e.g. the UAV controller model) uses sensor data s from sensors 520 (e.g. the one or more sensors) and learned data 530 $\theta_E$, $\theta_{QD}$, $\theta_u$ to generate control commands u for motors 540 (e.g. actuators) of the drone. The control commands u are generated using u=f(s, t|$\theta_E$, $\theta_{QD}$, $\theta_u$). The sensor data is influenced by the environment/physics, and is based on the motion performed by the motors 540. The UAV controller is parameterized by $\theta_E$, $\theta_{QD}$, $\theta_u$ and trained using Machine Learning to minimize/decrease a tracking error in the presence of external disturbances such as wind. $\theta_E$ is the learned data of the state estimator, $\theta_{QD}$ is the learned data of a critic function of the drone, and $\theta_u$ is the learned data of an actor function for generating the control commands u.

For example, sensor data s may include at least one element of the group of inertial sensor data (e.g. acceleration/angular velocity of drone), magnetometer data (e.g. a magnetic field vector), Barometric data (e.g. air pressure), GNSS data (e.g. Global Navigation Satellite System, such as the Global Positioning System, BeiDou Navigation Satellite System, GLONASS, etc.), image data (e.g. one or multiple cameras, such as ToF cameras, multi/hyper-spectral cameras, IR cameras etc.), actuator data (e.g. voltage, current, RPM, torque, force) and anemometer data (e.g. wind speed).

FIG. 5b illustrates a controller synthesis of the UAV controller model (e.g., based on Actor-Critic approach/Deterministic Policy Grading (DPG) algorithm and State Estimation). FIG. 5b shows a state estimator 550, which provides x(s, t|$\theta_E$) to a critic function 560 and to an actor function 570. The state estimator is parameterized by the sensor data s and $\theta_E$. The state estimator may be implemented using an extended Kalman filter, Deep Neural Network etc., which is parameterized by $\theta_E$. The critic function may provide $Q_{Drone}$(x, u|$\theta_{QD}$) to the actor function 570. The critic function may e.g. be a deep neural network, parameterized by $\theta_{QD}$ and trained using the Bellman equation $Q_{Drone}(x, u) = r_{Drone} + \gamma \max_u Q_{Drone}(x', u')$. The actor function may provide the control commands u(x, t|$\theta_u$). The actor function may e.g. be implemented using a deep neural network, parameterized by $\theta_u$, updated using critic function (see e.g. Silver et al. 2014).

Figure 6A:
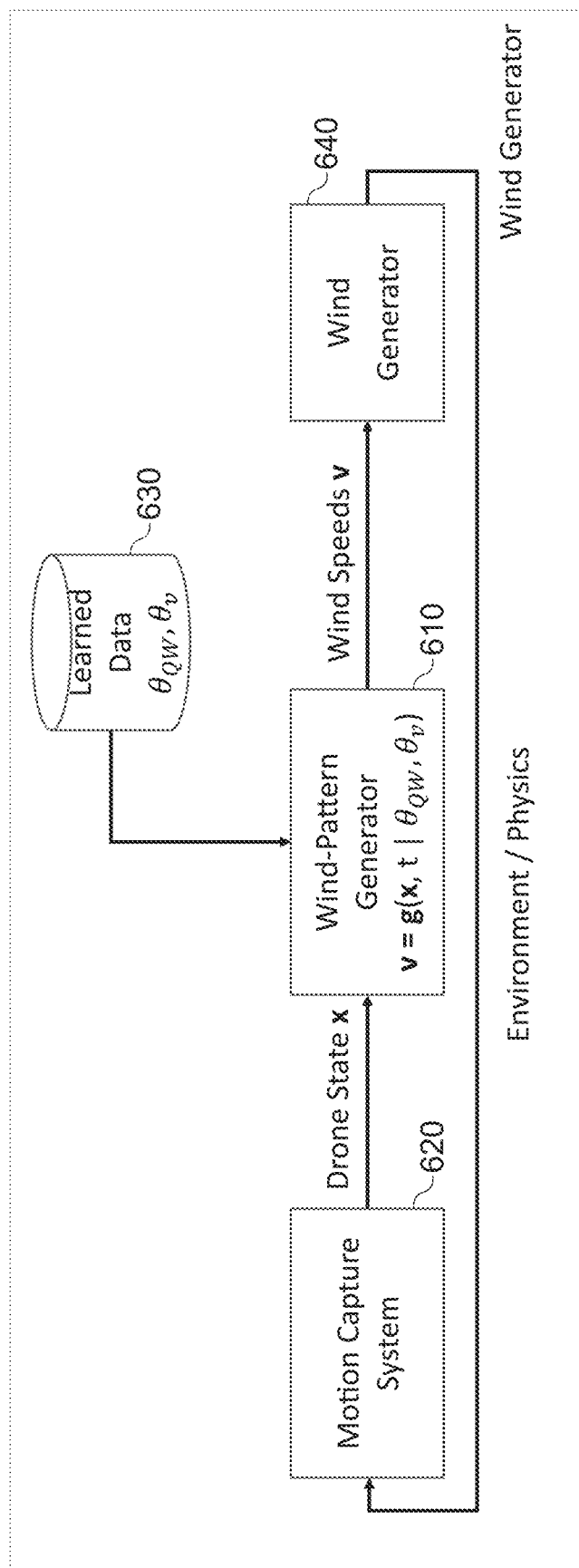
FIGS. 6a and 6b show flow charts of embodiments of a wind controller model.
Figure 6B:
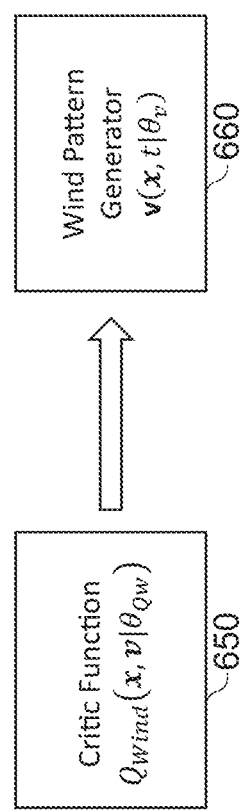

FIGS. 6a and 6b show flow charts of embodiments of a wind controller model. FIG. 6a shows the application of the wind controller model, e.g. when used for controlling a wind generator. In FIG. 6a, a wind pattern generator 610 (e.g. the wind controller model) uses a drone state x (e.g. the motion-tracking data) generated by a motion capture system 620 and learned data 630 $\theta_{QW}$, $\theta_v$ to generate wind speeds v for a wind generator 640 (e.g. the wind generator 10). The wind speeds are generated using v=g(x, t|$\theta_{QW}$, $\theta_v$). The drone state x is influenced by the environment/physics, and is based on the wind generated by the wind generator 640. The wind-pattern generator is parameterized by $\theta_{QW}$, $\theta_v$ and trained using Machine Learning to increase or maximize a tracking error of the drone. $\theta_{QW}$ is the learned data of a critic function of the drone, and $\theta_v$ is learned data of an actor function for generating the wind speeds v.

FIG. 6b illustrates a wind generator synthesis of the wind controller model (e.g. based on Actor-Critic approach/DPG algorithm). FIG. 6b shows a critic function 650, which provides $Q_{wind}$(x, v|$\theta_{QW}$) to an actor function of a wind pattern generator 660. The critic function may be implemented using a deep neural network with parameters $\theta_{QW}$ and trained using the Bellman equation $Q_{Wind}(x, v) = r_{Wind} + \gamma \max_v Q_{Wind}(x', v')$. The actor function of the wind pattern generator may provide the wind speeds v(x, t|$\theta_v$). The actor function of the wind pattern generator may e.g. be implemented using a deep neural network, parameterized by $\theta_v$, updated using critic function (see e.g. Silver et al. 2014).

Figure 7:
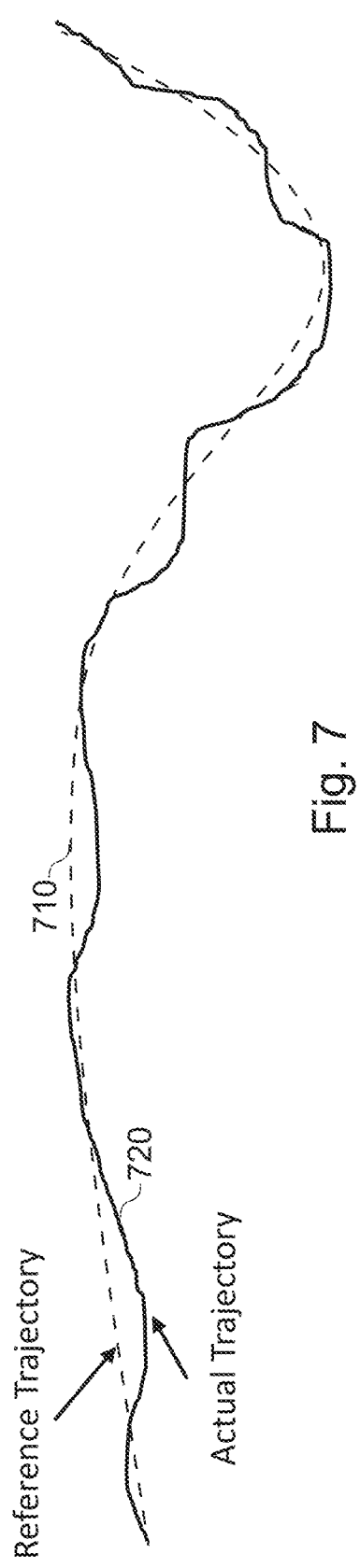
FIG. 7 illustrates reward functions that are based on a tracking-error of a drone for a given trajectory.

FIG. 7 illustrates reward functions that are based on a tracking-error of a drone for a given trajectory. FIG. 7 shows a reference trajectory 710 and an actual trajectory 720. $r_{Drone}$ may be defined as a negative tracking error of a drone for a given trajectory, and $r_{Wind}$ may be defined as tracking error of drone for a given trajectory. $r_{Wind}$ and $r_{Drone}$ are the reward functions for the critic function of the wind controller and of the drone controller, respectively.

FIG. 8 shows a schematic diagram of an exemplary embodiment of an iterative adversarial learning process. The iterative adversarial learning process of FIG. 8 comprises four consecutive blocks, a first "Evaluate" block 810, an "Update Controller Policy" block 820, a second "Evaluate" block 830, and an "Update Wind Policy" block 840. In the first "Evaluate" block 810, one or more test flights may be performed with a wind-policy and a controller policy. Of the test flight(s), the sensor data s(t), the control functions u(t), the reward function of the drone $r_{Drone}$(t), the drone state x(t), the wind speeds v(t) and the reward function of the wind generator $r_{Wind}$(t) may be recorded 815 for time t. In the "Update Controller Policy" block 820, the controller policy may be improved/trained by reducing or minimizing the deviation of the target trajectory, and the learned data $\theta_E$, $\theta_{QD}$, $\theta_u$ 825 may be computed. In the second "Evaluate" block 830, one or more test flights may be performed with the wind-policy and the updated/improved controller policy. Again, of the test flight(s), the sensor data s(t), the control functions u(t), the reward function of the drone $r_{Drone}$(t), the drone state x(t), the wind speeds v(t) and the reward function of the wind generator $r_{Wind}$(t) may be recorded 835 for time t. In the "Update Wind Policy" block 840, the wind policy may be improved/trained by increasing/maximizing a deviation from the target trajectory, and the learned data $\theta_{QW}$, $\theta_v$ 845 may be computed. Based on the updated wind policy, the first "Evaluate" block may be executed using the updated/improved wind policy. In embodiments, each combination of "Evaluate/Update" may be performed a plurality of times before advancing to the next "Evaluate/Update". In other words, a controller policy may be evaluated and updated multiple times before advancing to the evaluation and update of the wind policy, and the wind policy may be evaluated and improved multiple times before advancing to the evaluation and update of the controller policy. In embodiments, the controller policy may correspond to or be part of the UAV controller model, and the wind policy may correspond to or be part of the wind controller model.

Alternatively or additionally, a population-based stochastic search may be used to improve the UAV controller model and/or the wind controller model. FIG. 9 shows a schematic diagram of an exemplary embodiment of a Population-based Stochastic Search. FIG. 9 shows a population of controllers 910 [($\theta_E$, $\theta_{QD}$, $\theta_u$), . . . ], a population of wind generators [($\theta_{QW}$, $\theta_v$), . . . ] 920, and an evaluation block 930. To improve the UAV controller model and/or the wind controller model, the population of controllers 910 may generate controller models by applying variations to previous controller models, select one or more of the generated controller models and provide them to the evaluation block 930. Likewise, the population of wind generators 920 may generate wind generator models by applying variations to previous wind generator models, select one or more of the generated wind generator models and provide them to the evaluation block 930. The evaluation block 930 may rank the provided models (e.g. using the reward functions), and the population of controllers 910 and the population of wind generators may generate further models based on the ranking of the previously provided models.

Embodiments provide an UAV comprising actuators for propelling UAV, storage for storing flight control parameters acquired by learning process, a plurality of sensors for detecting a wind situation, a flight controller for controlling attitude and trajectory of UAV, wherein the flight controller controls the attitude and trajectory of UAV using one of the control parameters selected according to detected wind situation. The plurality of sensors may comprise image sensors and image processors for capturing images or videos, including, e.g. cameras recording the motion of the actuators (e.g., rotor blades) using a high frame rate, cameras recording deformable objects (e.g., plants, trees etc.) in the environment, cameras recording the trajectories of other UAV, wherein the image processors perform image processing in order to detect the wind conditions, to compensate unexpected attitude and trajectory of UAV due to the wind, e.g. to stabilize an image, to image a same object/point while UAV is swinging or moving by the wind. For example, the plurality of sensors may be selected among various sensors to provide inertial sensor data (acceleration/angular velocity of drone), magnetometer data (magnetic field vector), barometric data (air pressure). GNSS data (GPS, BeiDou Navigation Satellite System, GLONASS, etc.), image data (one or multiple cameras, ToF cameras, multi/hyper-spectral cameras, IR cameras etc.), actuator data (voltage, current, RPM, torque, force), and/or anemometer data (wind speed). The actuator data may originate form force sensor connected to actuators (e.g. at a base of motors, or between motor and propellers), from a torque sensor connected to actuators, or from a pressure sensor (e.g., attached to surface of UAV, or attached to control surfaces, propellers etc.).

The learning process may be an adversarial learning process by using a wind generator, e.g. a static wind generator such as wind tunnel, ventilator etc., or a dynamic, spatio-temporal wind generator such as WindShape.

Embodiments provide a system for generating flight control parameters (e.g. an UAV controller model) for an UAV, comprising a wind generator, an UAV, a motion-tracking system for detecting attitude and position of the UAV, and a reinforcement learning system.

The following examples pertain to further embodiments:
(1) A method for designing an Unmanned Aerial Vehicle, UAV, controller model for controlling an UAV, the method comprising:
Providing a wind generator control signal to a wind generator, to cause the wind generator to emit a wind current;
Operating the UAV using the UAV controller model, wherein a flight of the UAV is influenced by the wind generated by the wind generator;
Monitoring the flight of the UAV using a motion-tracking system to determine motion-tracking data; and
Synthesizing the UAV controller model using a machine-learning algorithm based on the motion-tracking data.
(2) The method according to (1), wherein the UAV controller model is synthesized based on a reinforcement learning-based machine-learning algorithm.
(3) The method according to (2) wherein the UAV controller model is synthesized using an Actor-Critic-approach.
(4) The method according to one of (1) to (3), wherein the UAV controller model is synthesized based on a population-based machine-learning algorithm.
(5) The method according to one of (1) to (4), wherein the UAV controller model is synthesized with the aim of decreasing a difference between a desired flight path of the UAV and a flight path of the UAV as monitored by the motion-tracking system.
(6) The method according to one of (1) to (5), further comprising generating the wind generator control signal based on a wind controller model, wherein the wind emitted towards the UAV is based on the wind controller model.
(7) The method according to (6), further comprising synthesizing the wind controller model using a machine-learning algorithm based on the motion-tracking data.
(8) The method according to (7), wherein the wind controller model is synthesized based on a reinforcement learning-based machine-learning algorithm.
(9) The method according to one of (7) to (8), wherein the wind controller model is synthesized based on a population-based machine-learning algorithm.
(10) The method according to one of (6) to (9), wherein the UAV controller model and the wind controller model are trained against each other using an adversarial reinforcement learning-based machine-learning algorithm or a population-based machine-learning algorithm.
(11) The method according to one of (6) to (10), wherein the wind controller model is synthesized with the aim of increasing a difference between a desired flight path of the UAV and a flight path of the UAV as monitored by the motion-tracking system.
(12) The method according to one of (1) to (11), wherein the motion-tracking system is a camera-based motion-tracking system, wherein the motion-tracking system is a radio-based positioning system, and/or wherein the motion-tracking system is external to the UAV.
(13) The method according to one of (1) to (12), wherein the wind generator control signal is suitable for independently controlling a plurality of wind generator units of the wind generator, the plurality of wind generator units being suitable for emitting a plurality of streams of wind, the wind current being based on the plurality of streams of wind.
(14) The method according to (13), wherein the plurality of wind generator units are arranged in an array configuration.
(15) The method according to one of (1) to (14), wherein the UAV controller model is specific to a type and/or a configuration of the UAV.
(16) The method according to one of (1) to (15), wherein the synthesis of the UAV controller model is further based on an estimation of wind conditions based on sensor data of one or more sensors of the UAV.
(17) A computer program having a program code for performing the method according to one of the previous claims, when the computer program is executed on a computer, a processor, or a programmable hardware component.
(18) A system comprising:
an Unmanned Aerial Vehicle, UAV, that is operated using an UAV controller model;
a wind generator for generating a wind current;
a motion-tracking system for monitoring a flight of the UAV; and a control module configured to:
Provide a wind generator control signal to the wind generator, to cause the wind generator to emit the wind current to influence the flight of the UAV,
Monitor the flight of the UAV using the motion-tracking system to determine motion-tracking data, and
Synthesize the UAV controller model using a machine-learning algorithm based on the motion-tracking data.
(19) An Unmanned Aerial Vehicle, UAV, comprising:
one or more actuators for propelling the UAV;
one or more sensors for providing sensor data related to a motion of the UAV caused by wind; and
a controller configured to control the one or more actuators based on an UAV controller model and based on the sensor data,
wherein the UAV controller model is at least partially based on motion-tracking data of a training UAV, the motion-tracking data being taken of the training UAV while a flight of the training UAV is affected by a wind current emitted by a wind generator.
(20) The UAV according to (19), wherein the UAV controller model is synthesized using a machine-learning algorithm based on the motion-tracking data of the training UAV.
(21) The UAV according to one of (19) or (20), wherein the controller is configured to obtain the sensor data from the one or more sensors and/or from the one or more actuators.
(22) The UAV according to one of (19) to (21), wherein the UAV controller model is synthesized using the method of one of (1) to (16).
(23) The UAV according to one of (19) to (22), wherein the one or more sensors comprise one or more sensors of the group of an inertial sensor, a magnetometer, a barometric sensor, a satellite positioning sensor, an image sensor, a force sensor, a torque sensor, a range sensor, a depth sensor, a radio signal transceiver, and an anemometer,
and/or wherein the sensor data comprises one or more elements of the group of inertial sensor data, magnetometer data, barometric data, satellite positioning data, image data, actuator data and anemometer data, force sensor data, torque sensor data, range sensor data, depth sensor data and radio positioning sensor data.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for designing an Unmanned Aerial Vehicle (UAV) controller model for controlling an UAV, the method comprising:
   Generating a wind generator control signal based on a wind controller model, wherein a wind current emitted towards the UAV is based on the wind controller model;
   Providing the wind generator control signal to the wind generator, to cause the wind generator to emit the wind current;
   Operating the UAV using the UAV controller model, wherein a flight of the UAV is influenced by the wind generated by the wind generator;
   Monitoring the flight of the UAV using a motion-tracking system to determine motion-tracking data;
   Controlling the wind generator control signal to increase a difference between a desired flight path of the UAV and a flight path of the UAV as monitored by the motion-tracking system;
   Synthesizing the wind controller model using a machine-learning algorithm based on the motion-tracking data, wherein the machine-learning algorithm is an adversarial reinforcement learning-based machine-learning algorithm or a population-based machine-learning algorithm; and
   Synthesizing the UAV controller model using the machine-learning algorithm based on the motion-tracking data, wherein the UAV controller model and the wind controller model are trained against each other using an adversarial reinforcement learning-based machine-learning algorithm or a population-based machine-learning algorithm in which the UAV controller model is synthesized to minimize the difference between the desired flight path of the UAV and the flight path of the UAV and the wind controller model is synthesized to maximize the difference between the desired flight path of the UAV and the flight path of the UAV.

2. The method according to claim 1, wherein the UAV controller model is synthesized based on a reinforcement learning-based machine-learning algorithm.

3. The method according to claim 2, wherein the UAV controller model is synthesized using an Actor-Critic-approach.

4. The method according to claim 1, wherein the UAV controller model is synthesized based on a population-based machine-learning algorithm.

5. The method according to claim 1, wherein the wind controller model is synthesized based on a reinforcement learning-based machine-learning algorithm,
   or wherein the wind controller model is synthesized based on a population-based machine-learning algorithm.

6. The method according to claim 1, wherein the motion-tracking system is a camera-based motion-tracking system, wherein the motion-tracking system is a radio-based positioning system,
   and/or wherein the motion-tracking system is external to the UAV.

7. The method according to claim 1, wherein the wind generator control signal is suitable for independently controlling a plurality of wind generator units of the wind generator, the plurality of wind generator units being suitable for emitting a plurality of streams of wind, the wind current being based on the plurality of streams of wind.

8. The method according to claim 7, wherein the plurality of wind generator units are arranged in an array configuration.

9. The method according to claim 1, wherein the UAV controller model is specific to a type and/or a configuration of the UAV.

10. The method according to claim 1, wherein the synthesis of the UAV controller model is further based on an estimation of wind conditions based on sensor data of one or more sensors of the UAV.

11. A computer program having a program code for performing the method according to claim 1, when the computer program is executed on a computer, a processor, or a programmable hardware component.

12. A system comprising:
    an Unmanned Aerial Vehicle (UAV) that is operated using an UAV controller model;
    a wind generator for generating a wind current;
    a motion-tracking system for monitoring a flight of the UAV; and
    a control module configured to:
    Generate a wind generator control signal based on a wind controller model, wherein the wind emitted towards the UAV is based on the wind controller model;
    Provide the wind generator control signal to the wind generator, to cause the wind generator to emit the wind current to influence the flight of the UAV,
    Monitor the flight of the UAV using the motion-tracking system to determine motion-tracking data,
    Control the wind generator control signal to increase a difference between a desired flight path of the UAV and a flight path of the UAV as monitored by the motion-tracking system;
    Synthesize the wind controller model using a machine-learning algorithm based on the motion-tracking data, wherein the machine-learning algorithm is an adversarial reinforcement learning-based machine-learning algorithm or a population-based machine-learning algorithm; and
    Synthesize the UAV controller model using the machine-learning algorithm based on the motion-tracking data, wherein the UAV controller model and the wind controller model are trained against each other using an adversarial reinforcement learning-based machine-learning algorithm or a population-based machine-learning algorithm in which the UAV controller model is synthesized to minimize the difference between the desired flight path of the UAV and the flight path of the UAV and the wind controller model is synthesized to maximize the difference between the desired flight path of the UAV and the flight path of the UAV.

13. An Unmanned Aerial Vehicle (UAV), comprising:
    one or more actuators for propelling the UAV;
    one or more sensors for providing sensor data related to a motion of the UAV caused by wind; and a controller configured to control the one or more actuators based on an UAV controller model and based on the sensor data, wherein the UAV controller model is synthesized using a machine-learning algorithm at least partially based on motion-tracking data of a training UAV, the motion-tracking data being taken of the training UAV while a flight of the training UAV is affected by a wind current emitted by a wind generator in which the wind generator is controlled using a wind controller model to increase a difference between a desired flight path of the UAV and a flight path of the UAV as monitored by the motion-tracking system, wherein the machine-learning algorithm is an adversarial reinforcement learning-based machine-learning algorithm or a population-based machine-learning algorithm, and wherein the UAV controller model and the wind controller model are trained against each other using an adversarial reinforcement learning-based machine-learning algorithm or a population-based machine-learning algorithm in which the UAV controller model is synthesized to minimize the difference between the desired flight path of the UAV and the flight path of the UAV and the wind controller model is synthesized to maximize the difference between the desired flight path of the UAV and the flight path of the UAV.

14. An Unmanned Aerial Vehicle (UAV), comprising:
one or more actuators for propelling the UAV;
one or more sensors for providing sensor data related to a motion of the UAV caused by wind; and
a controller configured to control the one or more actuators based on an UAV controller model and based on the sensor data,
wherein the UAV controller model is at least partially based on motion-tracking data of a training UAV, the motion-tracking data being taken of the training UAV while a flight of the training UAV is affected by a wind current emitted by a wind generator controlled using a wind controller model, wherein the UAV controller model and the wind controller model are synthesized using the method of claim 1.

15. The method according to claim 1, further comprising generating the wind generator control signal to be at least one of spatially variant and time-variant, wherein synthesizing the UAV controller model using the machine-learning algorithm based on the motion-tracking data for varied conditions output by the wind generator.

* * * * *